Dec. 22, 1970         A. H. ETESSAM         3,548,597
TURBINE ENGINE FOR AIRCRAFT HAVING A SUPPLEMENTARY
COMPRESSOR DRIVEN BY A SUPPLEMENTARY TURBINE
Filed Sept. 16, 1968                    3 Sheets-Sheet 1

INVENTOR
ALEXANDER HOSSEN ETESSAM
BY
*Kenyon & Kenyon*
ATTORNEYS

INVENTOR
ALEXANDER HOSSEN ETESSAM

United States Patent Office 3,548,597
Patented Dec. 22, 1970

3,548,597
TURBINE ENGINE FOR AIRCRAFT HAVING A SUPPLEMENTARY COMPRESSOR DRIVEN BY A SUPPLEMENTARY TURBINE
Alexander Hossen Etessam, 4558½ Fountain Ave., Los Angeles, Calif. 90029
Filed Sept. 16, 1968, Ser. No. 760,021
Int. Cl. F02k 3/04
U.S. Cl. 60—226    6 Claims

ABSTRACT OF THE DISCLOSURE

A gas turbine engine for aircraft power plants in which a supplementary compressor driven by the exhaust gases is used to pre-compress air fed to the main compressor, means being provided to close the main air inlet under selected operation conditions. The supplementary compressor may be arranged adjacent the main compressor or may be concentric with the supplementary turbine or may be mechanically connected and offset from the main power plant. The embodiments illustrate apparatus of the invention for turbo-prop engines, helicopter engines, jet engines, supersonic power plants incorporating after-burners and power plants or vertical-take-off aircraft.

---

The present invention relates to aircraft power plants and more particularly to gas turbine aircraft engines. Gas turbine aircraft engines require design to take account of an enormous variation in operating parameters resulting from different flight conditions among which altitude variation and aircraft speed variation between take-off and operating speed are of paramount importance. For example helicopters are presently limited in ceiling by limitations of rotor lift and engine performance at high altitudes. Since a major part of the helicopter's utility is at low altitudes, engines designed for operating at high altitudes cannot be used. Similarly supersonic aircraft have power plants designed for operation under extreme conditions of speed and altitude and are normally extremely inefficient at low altitudes.

It is an object of the invention to improve aircraft gas turbine power plants to provide for a more even performance over a range of altitude and speed.

In accordance with the invention there is provided in a gas turbine aircraft power plant having a gas generator including a main turbine and compressor units interconnected by a main shaft and a main air inlet to the main compressor unit, the improvement which comprises:

a supplementary turbine driven by the exhaust gases of the main turbine, a supplementary compressor driven by the supplementary turbine, supplementary air inlet means leading to the upstream side of the supplementary compressor, means enabling closure of the main air inlet, and duct means leading from the downstream side of the supplementary compressor to the upstream side of the main compressor at a position between the main compressor and said closure means.

The supplementary turbine may be arranged co-axially with, but independently of, the main shaft, downstream of the main turbine. The supplementary compressor may be arranged concentrically with and outwardly of the said supplementary turbine, for rotation therewith in a common medial plane. The duct means may include an annular manifold arranged downstream of the supplementary compressor and arranged to collect and redirect the compressed air emanating therefrom, and air passages leading from the manifold to positions in the main air inlet on the upstream side of the main compressor.

The power plant may be of the type having an annular radially directed main air inlet, said closure means comprising a plurality of vanes arranged around the circumference of the said main air inlet and pivotably movable to open and close such inlet.

Alternatively the power plant may be of the type having front main air inlet arranged between a central hub and a surrounding fairing, said closure means comprising a plurality of vanes movable pivotably about radial pivots to open and close said main air inlet.

The said manifold may comprise a second closure means which is openable under selected operation conditions to allow free exit to the air emanating from said supplementary compressor in a direction additional and parallel to and surrounding the main exhaust flow.

The power plant may also be of the type adapted for powering a supersonic aircraft and provided with an after-burner downstream of the said supplementary turbine, third duct means being arranged to direct part of said air emanating from said supplementary compressor into said after-burner to provide a combustion mixture.

The power plant may also be of the type adapted to power a vertical-take-off aircraft and having exhaust gases to one or more adjustable nozzles remote from said gas generator, wherein the said supplementary compressor is arranged concentrically with and outwardly of the said supplementary turbine, for rotation therewith in a common medial plane and wherein said supplementary turbine is arranged in said nozzles with said supplementary compressor providing by-pass air through a diffuser to augment the thrust of the exhaust gases, part of the air emanating from the supplementary compressor being returned by said first duct means to the upstream side of said main compressor.

Further objects and advantages of the invention will become apparent from the following explanation and detailed description of preferred embodiments in which reference is made to the drawings accompanying and forming part of the specification, in which:

FIGS. 1a, b, c, and d are block diagrams provided for comparison purposes to illustrate known types of aircraft gas turbine power plants, FIGS. 2a–2e are similar block diagrams indicating various forms of the present invention, FIG. 3 is a partly diagrammatic cross-sectional view of a known type of jet engine which has been modified to include one form of the present invention, FIG. 4 is a part cross-sectional view along the line 4—4 of FIG. 3, FIG. 5 is a partly broken side elevation illustrating an air inlet arrangement, for engines having a front air inlet, FIG. 6 is a partly diagrammatic longitudinal view through part of a supersonic engine fitted with an after-burner, FIG. 7 is a partly diagrammatic sectional view of a rotating nozzle for a VSTOL aircraft in which the power plant has been modified in accordance with the present invention, FIG. 8 is a diagrammatic cross-sectional view of an alternative arrangement of a power plant in accordance with the invention, adapted for a front main air inlet, and FIG. 9 is a view similar to FIG. 8 of a power plant arranged for a circumferential air inlet.

To illustrate the principles of the invention reference is first made to FIG. 1 which shows four types of common arrangements of aircraft gas turbine engines. FIG. 1a shows the normal form of gas generator, the compressor C being arranged on the same shift as the turbine T with a centrally arranged combustion chamber diagrammatically indicated at 10. The unbroken line indicates the passage of gases and the broken line indicates that the turbine and compressor are directly mechanically coupled.

Figure 1:
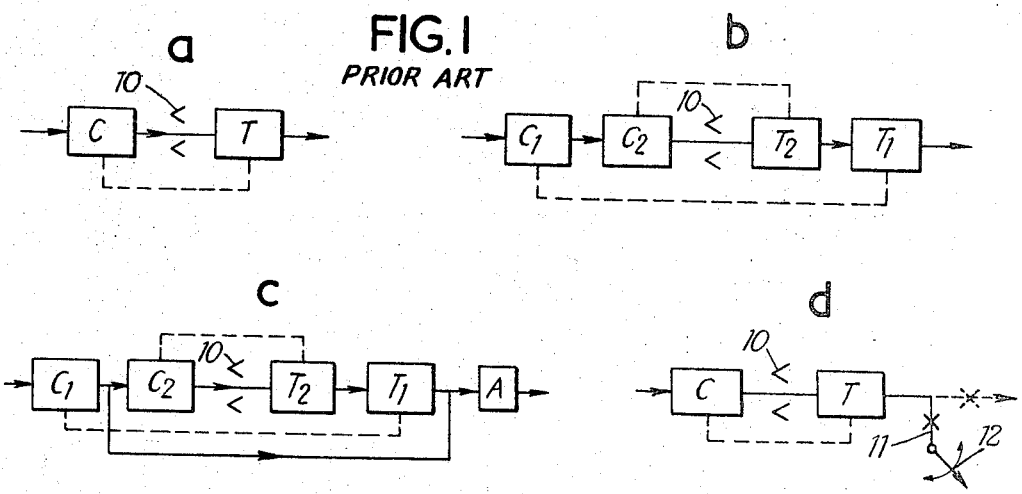
FIG. 1b shows a split-shaft or free turbine engine in which a low pressure turbine $T_1$ is mechanically coupled to low pressure compressor $C_1$ and a high pressure turbine $T_2$ is mechanically coupled to a high pressure compressor $C_2$. The shafts for the two independent mechanical units are concentrically arranged.
FIG. 1c illustrates a supersonic engine with an afterburner A employing a free turbine as arranged in FIG. 1b and with air by-passed from a position between compressors to feed the after-burner.

FIG. 1d illustrates the normal type of gas generator arranged for a VSTOL engine. The exhaust gases are ducted away from the main power plant along a duct 11 to a rotatable nozzle 12. If desired the main gas stream may be diverted during operational flight directly in line with the gases of the engine as indicated by the dotted arrow, alternate shut-off valves being used as indicated.

Figure 2:
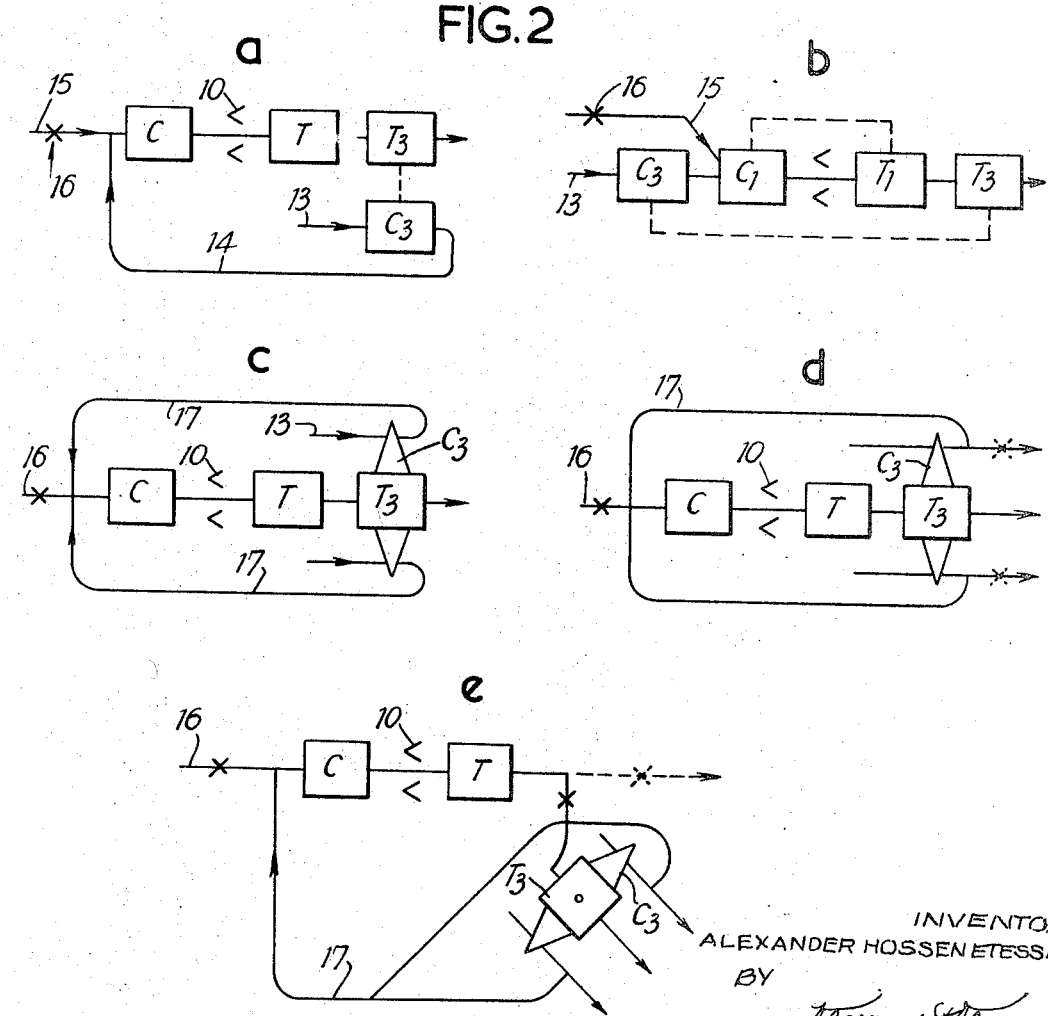

FIG. 2a shows the normal gas generator arranged in accordance with the invention. The exhaust gases are fed through a supplementary turbine $T_3$ which is mechanically coupled in any desired manner with a supplementary compressor $C_3$ which is provided with an independent supplementary air inlet 13. The compressed air from the supplementary compressor $C_3$ is ducted along the line 14 to a position on the upstream side of the main compressor C downstream of the main air inlet 15, and means indicated by the valve 16 are provided for closing the main air inlet 15 under selected operating conditions.

In FIG. 2a the supplementary compressor $C_3$ may be arranged offset from the main shaft and coupled to turbine $T_3$ by axuliary shafts and gears. In FIG. 2b the inventive modification is shown following the general principles of the free turbine engine of FIG. 1b. The supplementary turbine $T_3$ takes the place of the low pressure turbine $T_1$ and is coupled to a low pressure or upstream compressor $C_3$. In accordance with the principles of the invention independent air inlets are provided to the compressors $C_1$ and $C_3$, these being of comparable area and shut-off valve 16 is provided in the main air inlet 15.

In FIG. 2c the supplementary compressor $C_3$ is arranged concentrically and outwardly of the supplementary turbine $T_3$ on the same framework which is arranged for rotation on the same axis but independently of the gas generator CT. Thus the supplementary turbine and compressor form a single unit rotating in a common plane with the compressor blades outside the turbine blades. The air is ducted along lines 17 to the front of the main compressor as usual. The lines 17 may be independent pipes fed from a common manifold on the downstream side of compressor $C_3$, the supplementary air inlet 13 being provided by the space between the pipes. If an annular duct is used instead of individual pipes then this should be provided with transverse passages to provide the supplementary air inlet 13.

If desired, as shown in FIG. 2d, axial ducting may be provided downstream of compressor $C_3$ to enable the air from compressor $C_3$ to be channelled parallel to the exhaust gases. This air may be passed through a diffuser to augment the mass flow of the exhaust gases or it may allow the compressor $C_3$ to rotate freely, i.e. to remove the load from compressor $C_3$. In the latter circumstances a shut-off valve should be provided as shown in broken lines in FIG. 2d. As will become apparent the embodiment of FIG. 2d has application in supersonic aircraft engines fitted with afterburners, the exhaust gases and main air stream for compressor $C_3$ being fed directly to the after-burner, provision being made for part of the air from compressor $C_3$ to be returned along lines 17 to the upstream side of the main compressor.

FIG. 2e shows an adaptation of the invention to a VSTOL engine. A rotor unit of the type of FIGS. 2c and 2d is used in the rotating nozzle. Part of the air stream from compressor $C_3$ is directed through a diffuser to augment the thrust of the exhaust gases and part is diverted along line 17 to increase the compression at the main air inlet.

Figure 3:
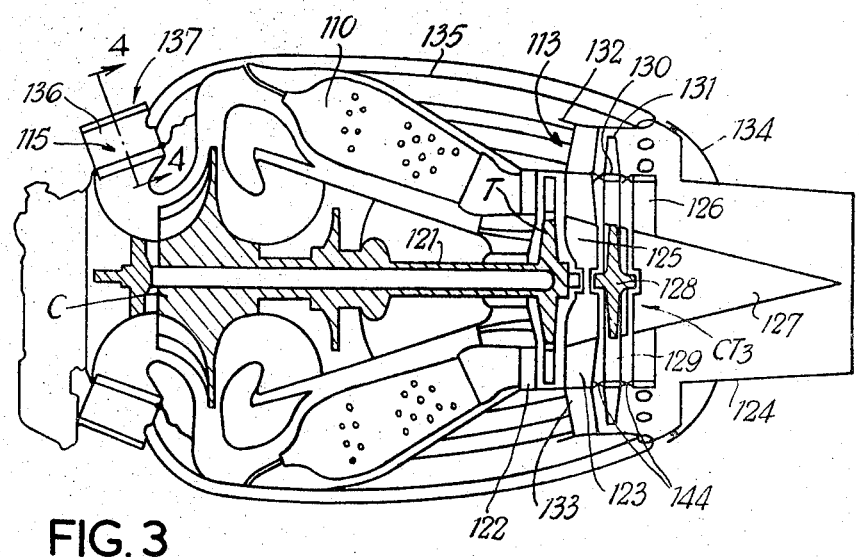

In FIG. 3 there is shown a jet engine of conventional type fitted with an annular circumferential air intake 115, modified in accordance with the invention. The main compressor C is of centrifugal type feeding to circumferentially arranged combustion chambers 110. The main turbine T is arranged on a common shaft 121 with the compressor C. Conventional arrays 122, 123 of stator vanes interconnect the outer casing 124 to an interior bearing structure 125. A supplementary array 126 of stator vanes interconnects the casing 124 with the tail cone assembly which together with the internal supporting structure 125 forms bearings for the supplementary turbine and compressor unit generally indicated $CT_3$ and which includes an interior hub 128, mounted for free rotation co-axially with shaft 121 aft of the main turbine T. The supplementary turbine blades 129 are connected to the hub 128 and are surrounded by a rim 130 to which the supplementary compressor blades 131 are mounted. Surrounding the blades 131 is an annular casing or cowling 132 supported from the casing 124 by compressor stator vanes 133. The casing 132 may taper downstream of the compressor blades 131 to connect with the casing 124, or may be provided as shown with an openable closure 134 which may be of the "eye-lid" type conventionally used for variable nozzles, e.g. at the tail end of after-burners. The casing 132 and the closure 134, if used, form a manifold with the casing 124. Extending from this manifold is a series of ducts or conduits 135 which convey the air compressed by compressor blades 131 forwardly to an air inlet manifold 136 which surrounds the main air inlet 115. The annular inlet 137 to the manifold 136 is provided with an openable closure which may be made up as better shown in FIG. 4 of a series of inter-engaging louvres 138 which are pivotable about axes 139 which extend in the longitudinal direction of the engine so that the louvres 138 may be pivoted to the position shown in broken lines to open the main air inlet. The ducts 135 preferably connect with both the manifold 136 and the compressor manifold in a partially tangential direction to improve flow efficiency.

Any other suitable variable closure system may be used at the main air inlet upstream of ducts 135.

It will be appreciated that the forward end of the compressor manifold defined between casing 132 and interior casing 124 is open at the forward end to provide a supplementary air inlet 113, air being drawn from between ducts 135.

In operation in high speed aircraft the closure 137 is closed at low altitudes where the ram pressure of incoming air through the main air inlet is low. The air then enters through the supplementary air inlet 113 and is compressed by the supplementary compressor before passing to the main air inlet manifold 136 where it arrives in a precompressed condition increasing the air pressure at the combustion chambers 110 and thus increasing performance where the engine is designed for optimum efficiency at high altitudes. At such high altitudes the closure 137 is opened to allow the engine to function normally under the conditions for which it is designed. Under these conditions the supplementary turbine and compressor unit $CT_3$ rotates substantially freely and imposes little or no load on the turbine. If desired the louvres 136 may be designed to open automatically under a predetermined pressure difference between the pressure prevailing in the main air inlet outside the closure 136 and that prevailing inside the closure.

Seals 144 are preferably provided between the ram 130 and the stator vanes on each side. No stator vanes are shown on the downstream side of the compressor blades but they may be provided in this position and arranged to guide the air in a tangential direction towards the entries of the ducts 135.

The "eye-lid" closure 134 may be used to further decrease any load caused by the compressor blades 131 at high altitude conditions, or it may be used to feed compressed air from the compressor blades 131 through a diffuser (see FIG. 6) to provide by-pass air to augment the thrust of the exhaust gases at the same time feeding back part of the compressed air through the ducts 135 to the inlet manifold 136.

In a fighter jet engine having a main compressor ratio of 3:1 and a supplementary compressor ratio of 3:1 the climb performance from sea altitude will be improved by a factor of about 3 and should enable a vertical climb from take-off.

The invention can be arranged as shown in FIG. 3 in a turbo-prop engine or a helicopter engine or other turbo-shaft engines, for low speed operation, the intake operation being reversed.

By way of example, a conventional helicopter engine may employ a compression ratio of 7:1. This is a relatively high compression ratio adapted as a compromise between ratios which would be effective at sea level and at elevated altitude. As modified according to the invention the main compressor may be designed for a 4:1 compression ratio. This is a suitable ratio for efficiency at sea level where the external static air pressure is high. The supplementary compressor may be given for example a 3:1 compression ratio which, when the main intake is closed at high altitudes, will provide an overall compression of 12:1. The inlets being of comparable area, the mass flow will also be increased by a factor of 3 giving the engine an increased performance factor of about 3, additive to the increase in efficiency.

Figure 5:
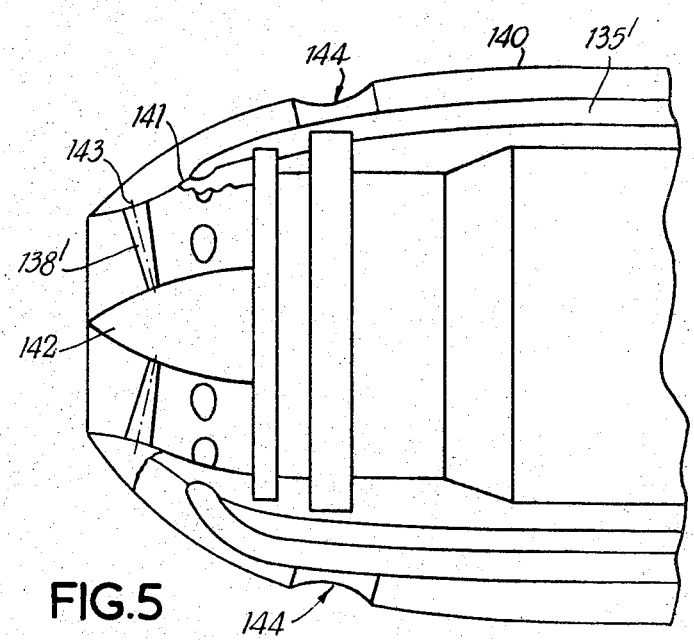

The arrangement of FIG. 3 may be used in any type of gas turbine aircraft power plant provided with a circumferential air inlet. FIG. 5 shows an example of a modified air inlet construction for use with a front directed main air inlet. The ducts 135' from the supplementary compressor may be enclosed within the outer fairing skin 140 (which has air inlets 144) and be led to apertures in the inner fairing skin 141 forward of the main air inlet. Generally radially directed louvres 138' may be arranged between the central hub 142 and the inner fairing skin 141, the louvres being pivoted on generally radially directed axes 143 and arranged to overlap and close under suitable flight conditions, e.g. at sea-level. They may also be arranged to open under differential pressure as previously described with reference to FIG. 3.

Figure 6:
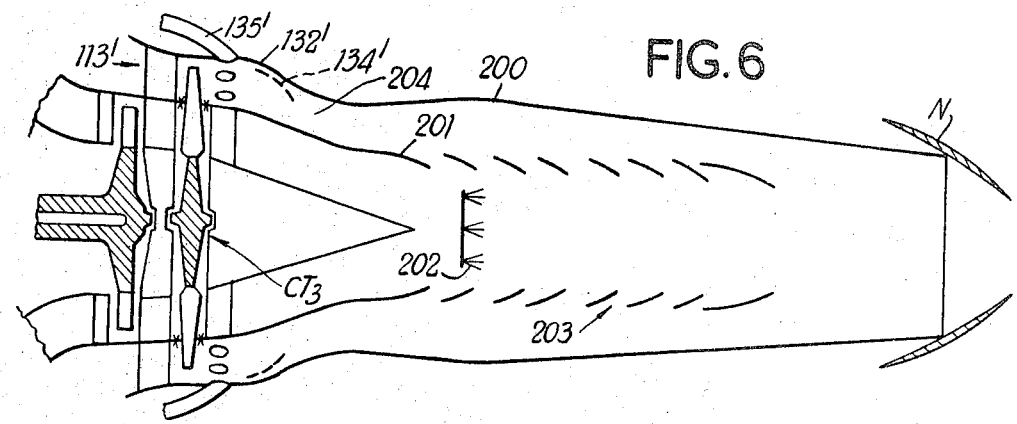

FIG. 6 illustrates an embodiment of the invention applied to an engine designed for supersonic speeds and fitted with an after-burner. As shown in FIG. 6 the concentric supplementary turbine-compressor unit CT$_3$ may be fitted downstream of the last turbine stage following the arrangement already described with reference to FIG. 3. The after-burner is generally indicated at A and includes as usual an outer casing 200 and an inner casing 201, the exhaust gases passing through the inner casing and being augmented with fuel through fuel nozzles 202, air being supplied through entries 203 in the inner casing from by-pass air supplied between the two casings. A variable nozzle is normally provided as shown at N at the rear end of the engine and may be of the "eye-lid" type.

The by-pass air is conventionally provided as for example in FIG. 1c from between the two compressor stages. In accordance with the present invention the by-pass air is provided by the supplementary compressor, the casing 132' of the compressor manifold being continuous with the power casing 200 and providing between itself and the inner casing 201 a diffuser or venturi constriction 204. Unlike the embodiment of FIG. 3 the manifold is not closed at the rear end but merely constricted, although a variable nozzle type closure 134' may be used as shown in broken lines if desired. In this arrangement the by-pass air which enters through the supplementary air inlet 113' is compressed and part is fed back to the main air inlet manifold (arranged for example as shown in FIG. 3 or FIG. 5) through the ducts 135'. The performance characteristics of this type of engine are generally the reverse of the modified turbo-shaft engines in that the main air inlet closure is closed at low altitudes and low speeds where there is no ram pressure at the main air inlet. Under these conditions the air fed to the main inlet is pre-compressed by the supplementary compressor. When the aircraft reaches high speed the ram pressure operates upstream of the main air inlet closure which is thereafter opened. By-pass air is continually supplied from the supplementary compressor. To overcome any reduction in pressure upon opening of the main air intake closure, closure means may be arranged to close the entries or exits of the ducts 135'. For example the closure 134' may be arranged to close the entries to ducts 135'.

It will be appreciated that at low speed, supersonic engines, which have a main compressor of low compression ratio designed to operate under high ram air pressure, are very inefficient and consume large quantities of fuel. By modifying the engines in accordance with the present invention a greatly increased air inlet pressure may be provided at low speeds enabling rapid take-off and increased angles of climb which are of extreme importance particularly in commercial aircraft due to the noise factor.

Figure 7:
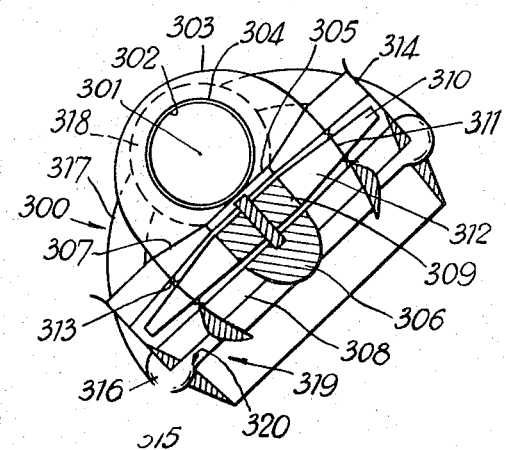

FIG. 7 illustrates a pivotable nozzle 300 for use in a VCTOL aircraft. The nozzle is arranged to pivot as a unit about an axis 301 which is at the centre of an exhaust duct 302 leading to the gas generator. The nozzle comprises a turbine casing 303 which is spheroidal in shape and formed in its side with a flange 304 adapted to fit around the exhaust duct 302 and enable the nozzle to be swivelled with respect to the duct 302. An internal bearing structure 305 and a hub 306 are mounted from the casing 303 by respective arrays 307 and 308 of stator vanes and provide bearings for the hub 309 of the supplementary turbine. As in the embodiment of FIG. 3 the compressor blades 310 are mounted on a rim 311 surrounding the tips of the turbine blades 312. Seals 313 may be provided between the rim 311 and the stator vanes on either side. The compressor blades are surrounded by an outer annular casing 314 which is connected to the inner skin 303 by further arrays of stator vanes on each side of the compressor blades. A further casing 315 defines an annular manifold 316 downstream of the compressor blades, the manifold being for the most part outside the interior surface of casing 314 so that only part of the compressed air is directed into the manifold. Ducts 317 lead from the manifold to a second manifold 318 which is provided by a casing outside and concentric with the flange 304. The exterior casing of the manifold 318 is free to rotate similarly to flange 304 about a complementary flange surface (not shown). One or more stationary pipes (not shown) lead from the interior wall of the compressor manifold 318 to the upstream side of the main compressor in accordance with the principles of the invention.

Downstream of the compressor blades 310 the exterior surface of casing 303 and the interior surface of casing 314 are suitably faired as shown to produce a diffuser 319 which allows part of the compressed air to expand and augment the thrust of the exhaust gases. The leading edge 320 of manifold 316 leads into the constricted portion of the diffuser so that a proportion of the compressed air, for example about one half may be trapped and fed through the ducts 317 to increase the compression at the main compressor. The effect of the supplementary turbine and compressor unit in the nozzle is cumulative. Thus the compressor may be designed to provide an overall mass flow ratio of 3:1 relative to the mass flow of exhaust gases. A mass flow in the ratio of 1:1 relative to the exhaust gases may be ducted back to the main air inlet where it is further compressed increasing the engine performance and the thrust and mass flow of exhaust gas. The by-pass air will be provided in a ratio of 2:1 in mass flow relative to the mass flow of exhaust gas. In this way the overall thrust at take-off may be rapidly built up.

Figure 8:
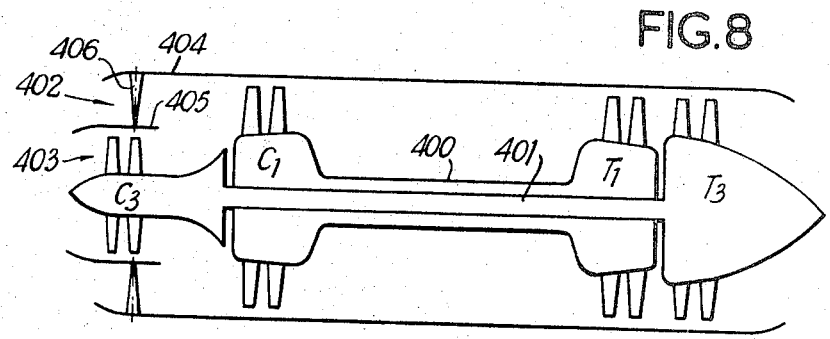
Figure 9:
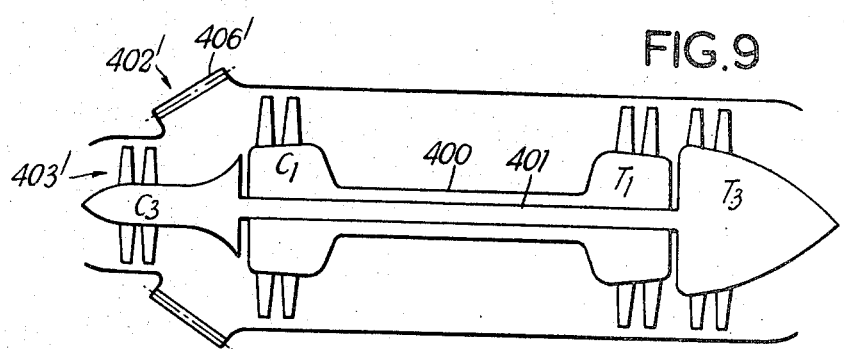

FIGS. 8 and 9 are semi-diagrammatic longitudinal sections of alternative forms of the invention following the block diagram representation of FIG. 2b. In both cases the main compressor $C_1$ and main turbine $T_1$ are arranged for operation at high compression and are mounted on a common shaft 400 which itself acts as a bearing for an inner shaft 401 upon which the supplementary turbine $T_3$ and supplementary compressor $C_3$ are mounted. The supplementary compressor $C_3$ is arranged as a low pressure compressor forwardly or upstream of the main compressor and the supplementary turbine is arranged as a low pressure turbine downstream and rearwardly of the main turbine $T_1$ following the normal constructional principles of free turbine engines. The arrangement of FIG. 8 is designed for a frontwardly directed main air intake. This main air intake 402 is arranged annularly around the supplementary air intake 403 between the outer fairing 404 and the inner casing 405. Closure louvres 406 of the type shown in FIG. 5 are arranged in the main air intake. The two air intakes should be of comparable area and it will be appreciated that this embodiment operates in substantially the same way as the other embodiments already described but renders the use of ducts such as the ducts 135 of FIG. 3 unnecessary.

Figure 4:
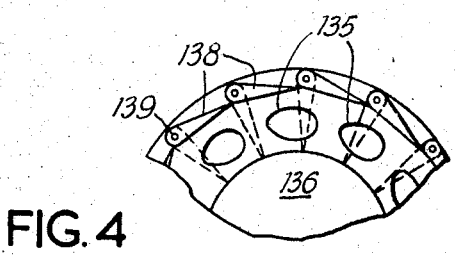

The embodiment of FIG. 9 is similar to that of FIG. 8 except for the arrangement of the main air intake 402' which is of annular shape like the intake 115 of FIG. 3, the louvres 406' being arranged substantially as in FIGS. 3 and 4. In both FIGS. 8 and 9 the hub of the supplementary compressor $C_3$ is designed aerodynamically in relation to the main air inlet to allow a smooth approach of incoming air from each inlet to the main compressor $C_1$.

It will be appreciated that many constructional features which are conventional in gas turbine aircraft power plants have been omitted. The detailed construction of the various embodiments follows in general conventional practice in the industry. For further details of conventional techniques which may be employed reference may be made to "Jet Aircraft Power Systems" by Jack V. Casamassa and Ralph D. Bent, McGraw-Hill Publishing Company, Third Edition and "Jet Propulsion for Aerospace Applications" (Second Edition) by Walter J. Hesse and Nicholas V. S. Mumford Jr., Pitman Publishing Corporation.

It will also be appreciated that the features of one embodiment may be incorporated with features of any other of the embodiments shown and that conventional features of aircraft power plants not shown herein may equally be incorporated as and when they are found to be appropriate. For example in the embodiment of FIG. 6 by-pass air from another source, e.g. between two compressor stages of a turbo-fan or other high speed plant may be added downstream of the diffuser 204 to increase performance. The embodiments of any of the figures may incorporate additional turbine or compressor stages according to the design for the various applications including incorporation of additional free turbine and compressor rotor assemblies. The embodiment of FIG. 7 is mainly adapted for fitment as a pod to the side of a fuselage, but may be given suitable adaptation for fitment within or underneath the wing. All the various embodiments are not intended to be limiting to the scope of the invention as defined by the following claims.

What I claim is:

1. In a gas turbine aircraft power plant having a gas generator including a main turbine and compressor units interconnected by a main shaft, and a main air inlet to the main compressor unit, the improvement which comprises: a supplementary turbine driven by the exhaust gases of the main turbine arranged co-axially with, but independently of, the main shaft, downstream of the main turbine, a supplementary compressor driven by the supplementary turbine, supplementary air inlet means leading to the upstream side of the supplementary compressor, said supplementary compressor being arranged concentrically with and outwardly of the said supplementary turbine for rotation therewith in a common medial plane, means enabling closure of the main air inlet, and duct means leading from the downstream side of the supplementary compressor to the upstream side of the main compressor at a position between said main compressor and said closure means.

2. The improvement of claim 1 wherein said duct means includes an annular manifold arranged downstream of the supplementary compressor and arranged to collect and redirect the compressed air emanating therefrom, and air passages leading from the manifold to positions in the main air inlet on the upstream side of the main compressor.

3. The improvement of claim 2 wherein the said power plant is of the type having an annular radially directed main air inlet, said closure means comprising a plurality of vanes arranged around the circumference of the said main air inlet and pivotably movable to open and close such inlet.

4. The improvement of claim 2 wherein the said power plant is of the type having front main air inlet arranged annularly between a central hub and a surrounding fairing, said closure means comprising a plurality of vanes movable pivotably about radial pivots to open and close said main air inlet.

5. The improvement of claim 2 wherein said manifold comprises a second closure means which is openable under selected operation conditions to allow free exit to the air emanating from said supplementary compressor in a direction additional and parallel to and surrounding the main exhaust flow.

6. The improvement of claim 1 wherein the said power plant is of the type adapted for powering a supersonic aircraft and provided with an after-burner downstream of the said supplementary turbine, third duct means being arranged to direct part of said air emanating from said supplementary compressor into said after-burner to provide a combustion mixture.

References Cited

UNITED STATES PATENTS

| 2,529,973 | 11/1950 | Sedille | 60—262 |
| 2,580,591 | 1/1952 | Pouit | 60—226 |
| 2,650,666 | 9/1953 | Dorand | 60—226 |
| 3,095,696 | 7/1963 | Rumble | 60—269 |

FOREIGN PATENTS

| 623,142 | 5/1949 | Great Britain | 60—39.29 |
| 713,783 | 8/1954 | Great Britain | 60—226 |

DOUGLAS HART, Primary Examiner

U.S. Cl. X.R.

60—39.16, 269